(12) United States Patent
Sakumoto

(10) Patent No.: US 7,387,336 B2
(45) Date of Patent: Jun. 17, 2008

(54) CHILD SEAT

(75) Inventor: Masayuki Sakumoto, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/499,646

(22) Filed: Aug. 7, 2006

(65) Prior Publication Data

US 2007/0040428 A1  Feb. 22, 2007

(30) Foreign Application Priority Data

Aug. 18, 2005  (JP)  ............... 2005-237882

(51) Int. Cl.
*A47D 1/10* (2006.01)
*A47D 15/00* (2006.01)
*A62B 35/00* (2006.01)
*B60N 2/16* (2006.01)

(52) U.S. Cl. ............... 297/250.1; 297/256.1; 297/256.11; 297/353; 297/410; 297/484

(58) Field of Classification Search ............ 297/250.1, 297/256.1, 256.11, 484, 353, 410
See application file for complete search history.

(56) References Cited

U.S. PATENT DOCUMENTS

| 6,030,047 | A  | * | 2/2000  | Kain ............... 297/484 |
| 6,398,302 | B1 | * | 6/2002  | Freedman et al. ....... 297/250.1 |
| 6,491,348 | B1 | * | 12/2002 | Kain ............... 297/484 |
| 6,623,074 | B2 | * | 9/2003  | Asbach et al. ........ 297/250.1 |
| 6,626,493 | B2 | * | 9/2003  | Kain ............... 297/250.1 |
| 6,688,685 | B2 | * | 2/2004  | Kain ............... 297/250.1 |
| 6,779,843 | B2 | * | 8/2004  | Kain ............... 297/250.1 |
| 6,820,939 | B1 |   | 11/2004 | Chen |
| 7,021,710 | B2 | * | 4/2006  | Kain et al. ........ 297/256.11 |
| 7,055,903 | B2 | * | 6/2006  | Balensiefer et al. ... 297/256.11 |
| 7,246,852 | B2 | * | 7/2007  | Balensiefer ........ 297/250.1 |
| 7,246,854 | B2 | * | 7/2007  | Dingman et al. ...... 297/250.1 |
| 7,261,376 | B2 | * | 8/2007  | Kespohl ........... 297/250.1 X |
| 7,306,284 | B2 | * | 12/2007 | Horton et al. ........ 297/250.1 |
| 7,322,647 | B2 | * | 1/2008  | Munn et al. ......... 297/250.1 |
| 2003/0164631 | A1 | * | 9/2003  | Sedlack ........... 297/250.1 |
| 2004/0075317 | A1 |   | 4/2004  | Yoshida et al. |
| 2004/0124676 | A1 | * | 7/2004  | Kain ............... 297/250.1 |
| 2004/0189068 | A1 | * | 9/2004  | Meeker et al. ........ 297/250.1 |
| 2004/0207241 | A1 | * | 10/2004 | Sedlack ........... 297/250.1 |
| 2004/0212232 | A1 | * | 10/2004 | Sedlack ........... 297/250.1 |
| 2004/0217636 | A1 | * | 11/2004 | Sedlack ........... 297/250.1 |
| 2006/0261650 | A1 | * | 11/2006 | Billman et al. ....... 297/250.1 |
| 2006/0261651 | A1 | * | 11/2006 | Nolan et al. ........ 297/250.1 |

FOREIGN PATENT DOCUMENTS

| EP | 1 564 065 A2 | 8/2005 |
| GB | 2 202 433 A | 9/1988 |
| JP | S63-154357 | 10/1988 |

* cited by examiner

*Primary Examiner*—Rodney B. White
(74) *Attorney, Agent, or Firm*—Manabu Kanesaka

(57) ABSTRACT

A child seat includes a main body having a seat portion and a backrest portion with a hole therein, a sliding member disposed at the backrest portion to cover the hole and having webbing inserting holes, and a guide rail mounted vertically on a rear side of the main body. A movable body is attached to the sliding member to move along the guide rail. The movable body is disposed on the rear side to be operable from a side of the backrest portion.

7 Claims, 6 Drawing Sheets

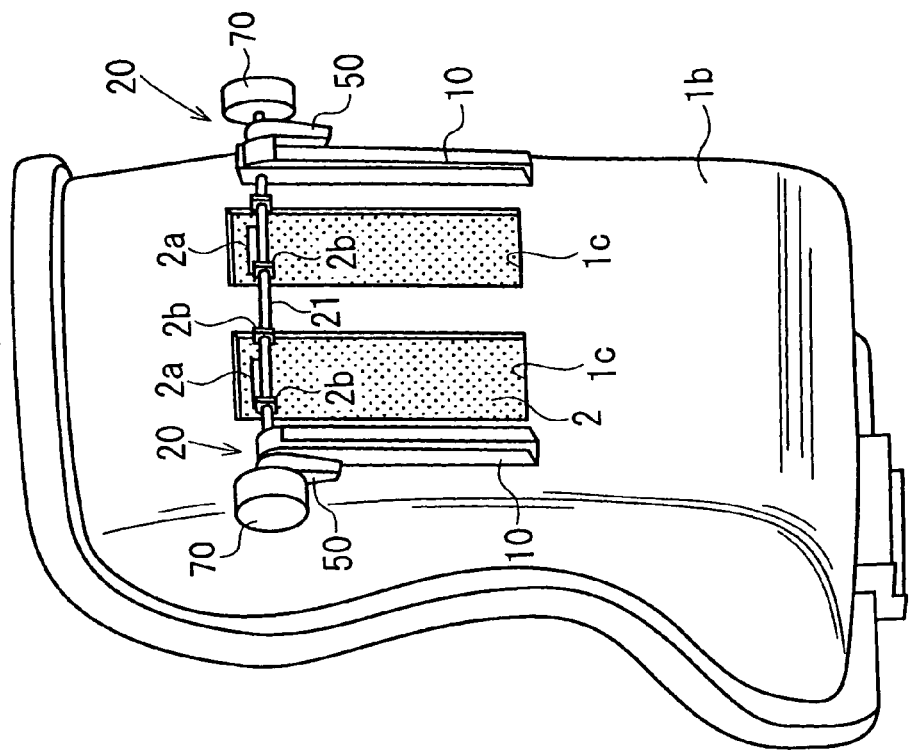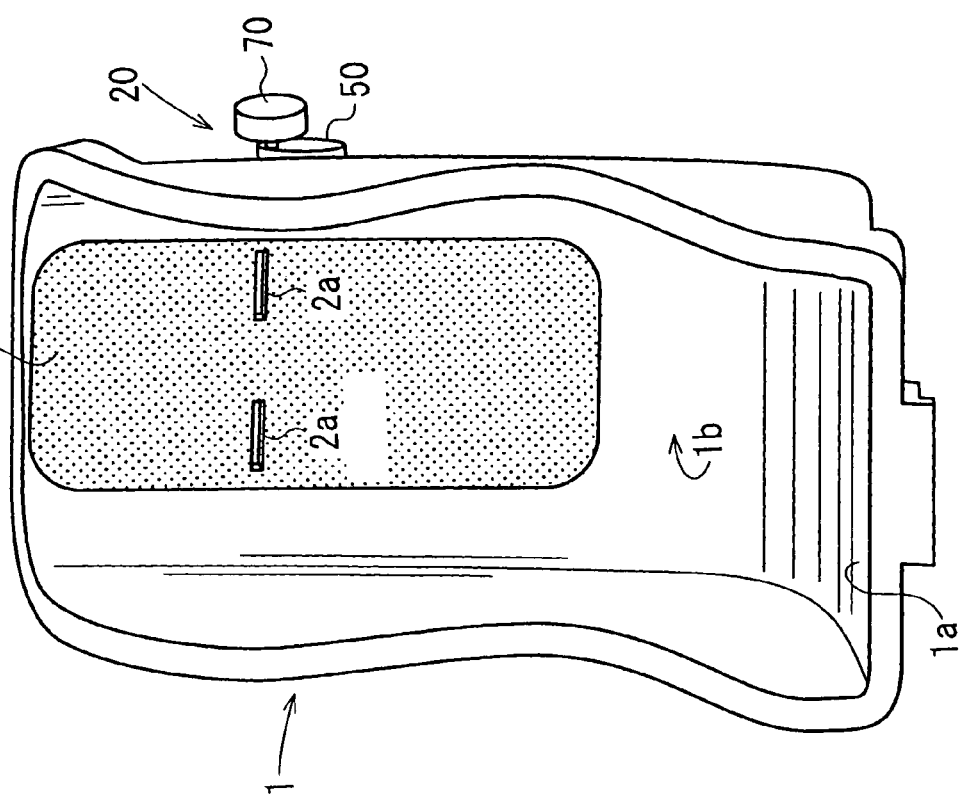

CHILD SEAT

BACKGROUND OF THE INVENTION AND RELATED ART STATEMENT

The present invention relates to a child seat provided on a seat of a vehicle and the like, particularly, to the child seat having a height adjusting device for a webbing laid on a child sitting on the child seat.

A child seating on a child seat is restrained with the child seat by a webbing provided on the child seat.

In the Japanese Unexamined Patent Application Publication No. 2004-331055, there is disclosed a child seat, in which a sliding member having webbing inserting holes (hereinafter, referred to as a locking body) is provided on a backrest portion of the child seat to vertically move, and the height of the webbing can be adjusted by moving the sliding member.

In a child seat in Japanese Unexamined Patent Application Publication No. 2004-331055, the height of a webbing can be adjusted only from the rear side of a backrest portion. Accordingly, when the child seat is fixed toward a front side of the vehicle seat, the height adjustment of the webbing cannot be performed or is considerably difficult to operate.

The object of the present invention is to provide the child seat which can easily adjust the height of the webbing from the side of the backrest portion.

Other objects and advantages of the invention will be apparent from the following description of the invention.

SUMMARY OF THE INVENTION

A child seat of a first aspect includes a main body of the seat having a seat portion and a backrest portion, a sliding member disposed at the backrest portion which is equipped with webbing inserting holes, a guide rail mounted on the main body of the seat which is vertically extended, and a movable body mounted on the sliding member which moves along the guide rail, in which the movable body is operable to move from the side of the backrest portion.

In a second aspect of the invention, in the child seat according to the first aspect, the guide rail includes a plurality of locking parts vertically provided at intervals, and a vertically extending rack are provided. The movable body includes a pinion engaging the rack, a handle connected to the pinion, an engaging body for locking the movable body by engaging the locking part, and an operating piece for engaging and disengaging the engaging body and the locking part. The handle and the operating piece are exposed from the side of the backrest portion to operate.

In a third aspect of the invention, in the child seat according to the second aspect, in which the webbing inserting hole and the handle are disposed in approximately same height.

In a fourth aspect of the invention, in the child seat of any one of the first to third aspects, the guide rails and the movable bodies are provided on the right and left of the backrest portion respectively, and an interlocking member for interlocking the left movable body and the right movable body is provided.

In the child seat of the present invention, the movable body for changing the height of the sliding member is operable to move from the side of the backrest portion. Accordingly, even when the child seat is provided toward the front side of the vehicle seat and the like, it is possible to easily adjust the height of the webbing.

In the child seat of the second aspect, by engaging the locking portion and the engaging portion by means of the operation of the operating piece, it is possible to lock the movable body in a desired height. By disengaging both locking portion and engaging portion, it is possible to move the sliding member and all of the movable bodies vertically. Under this state, when the handle is turned, the movable body and the sliding member move vertically. After moving to the desired height, the movable body is locked by operating the operating piece. Therefore, in the second aspect, it is possible very easily to adjust the height of the sliding member.

In the child seat of the third aspect, since the webbing inserting hole and the handle are disposed in substantially the same height, it is possible to know the height of the webbing inserting hole directly from the height of the handle when adjusting the height of the webbing. Therefore, it is very convenient.

In the child seat of the fourth aspect, since the left and right movable bodies are interlocked, even when it is operated only from the left side or only from the right side of the child seat, it is possible to move the movable bodies on both sides smoothly.

BRIEF DESCRIPTION OF THE DRAWING

FIG. 1(a) is a front perspective view of a seat main body of a child seat in accordance with an embodiment of the present invention, and FIG. 1(b) is a rear perspective view thereof.

DETAILED DESCRIPTION OF PREFERRED EMBODIMENTS

Figure 2:
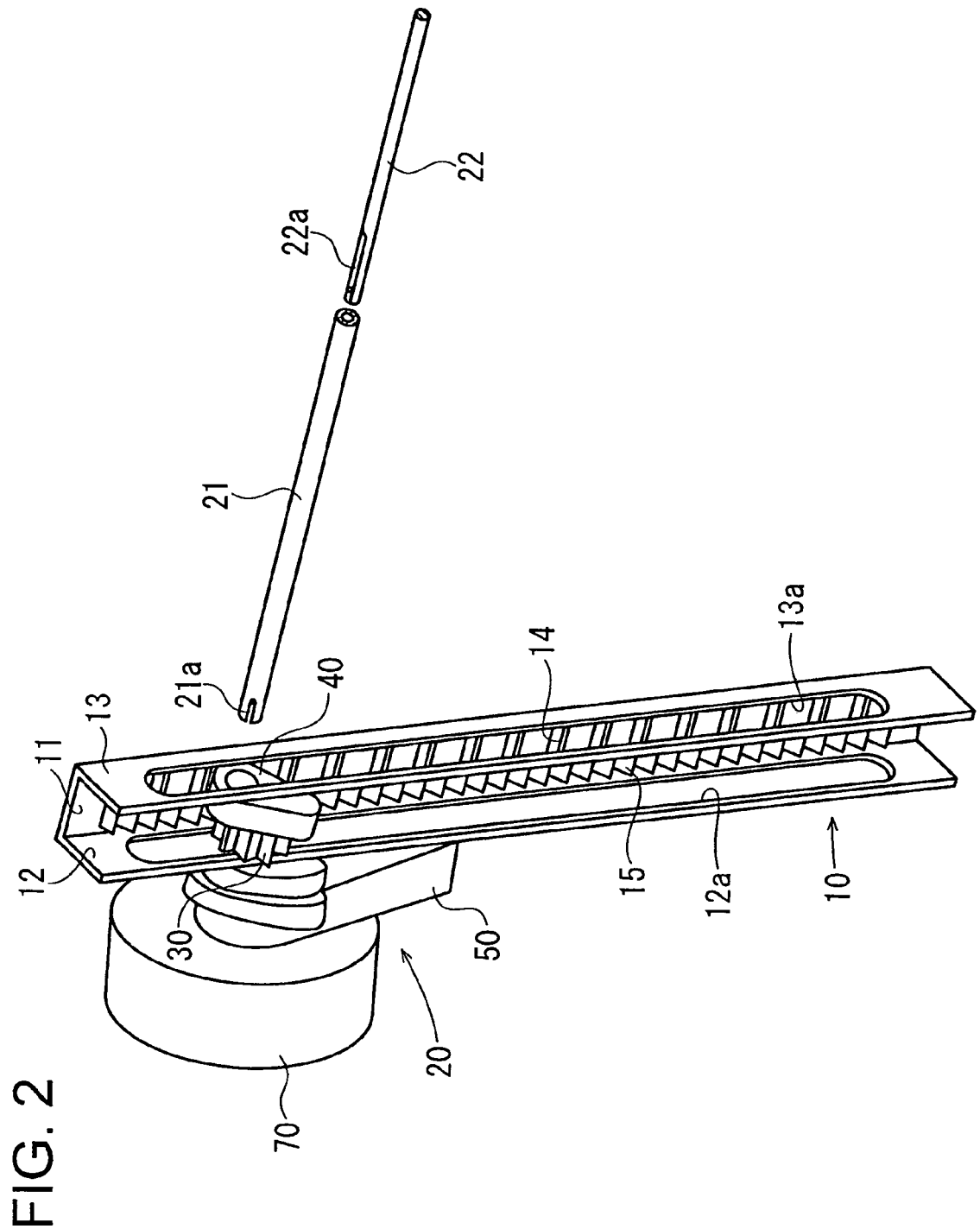
FIG. 2 is a perspective view of a guide rail and a movable body.
Figure 3A:
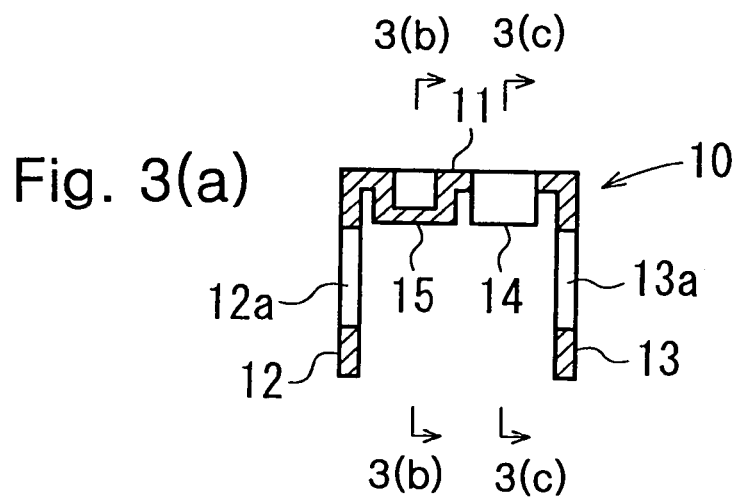
FIG. 3(a) is a horizontal cross-sectional view of a guide rail.
Figure 3B:
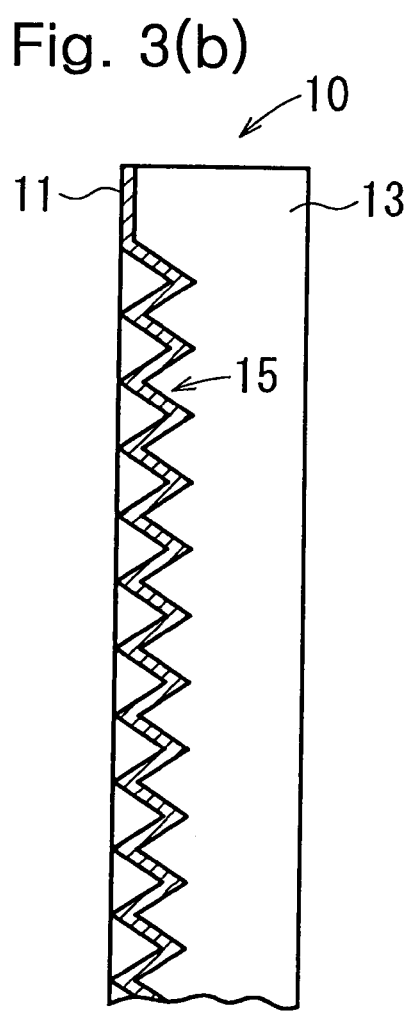
FIGS. 3(b) and 3(c) are cross-sectional views taken along lines 3(b)-3(b) and 3(c)-3(c) in FIG. 3(a), respectively.
Figure 3C:
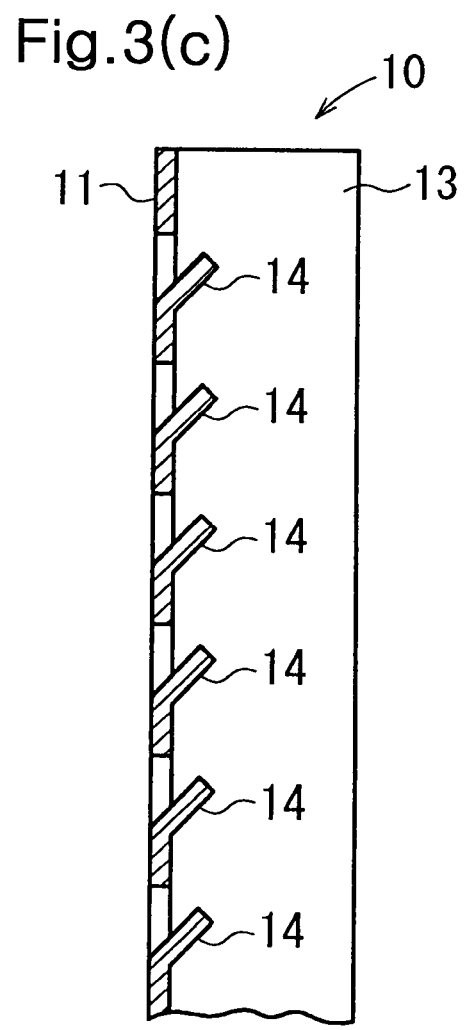
Figure 4:
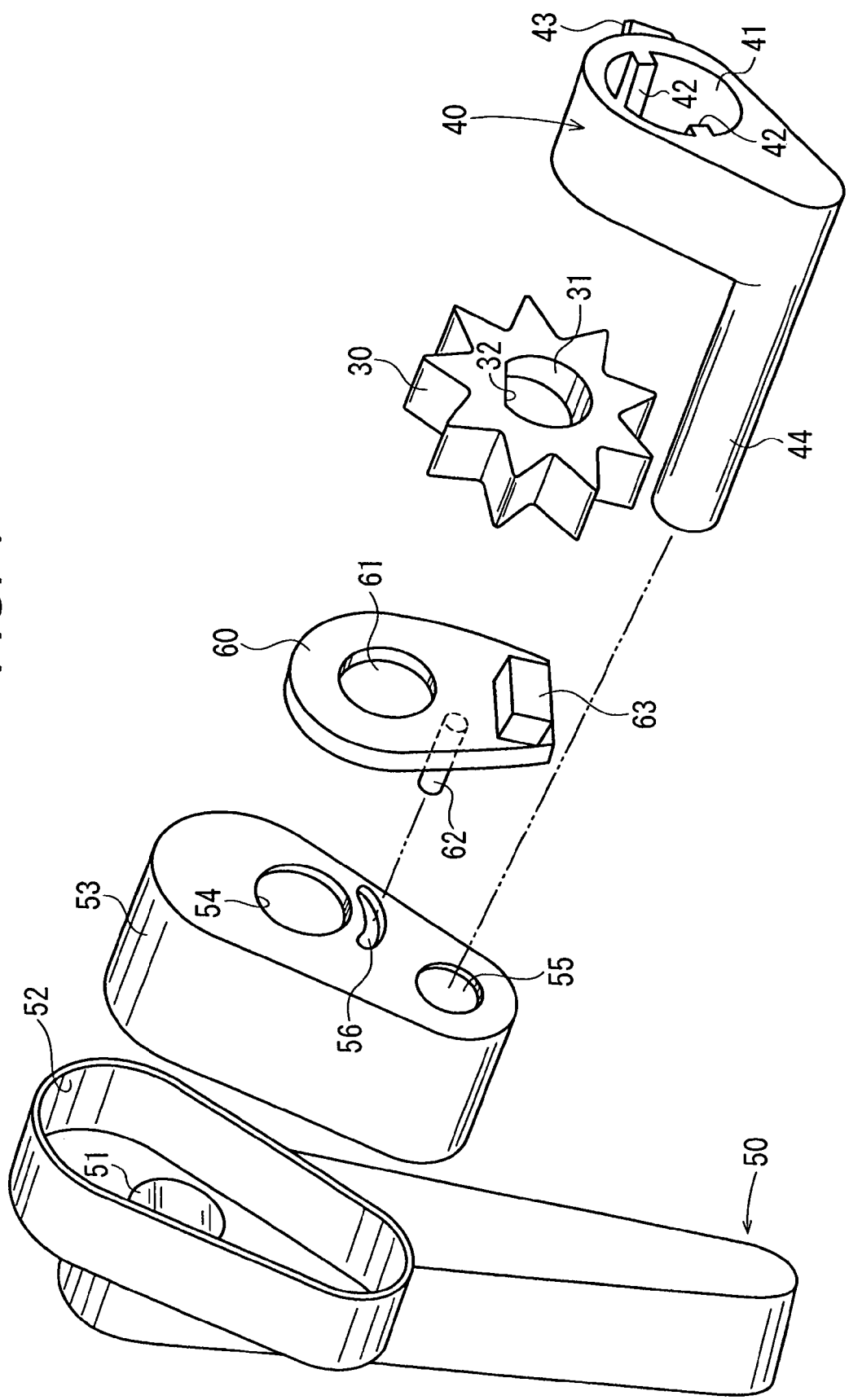
FIG. 4 is an exploded perspective view of a movable body.
Figure 5:
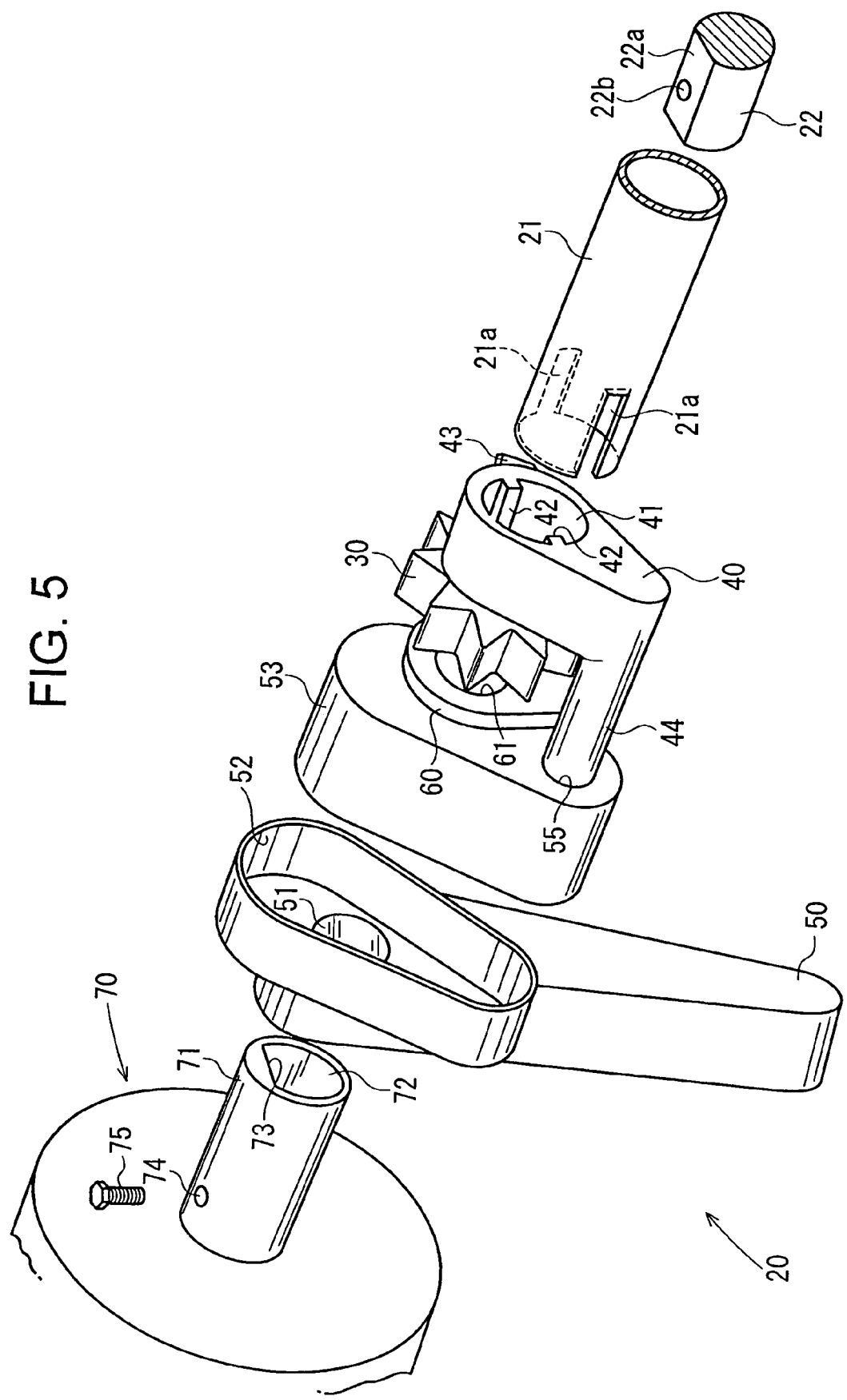
FIG. 5 is an exploded perspective view showing the movable body.
Figure 6:
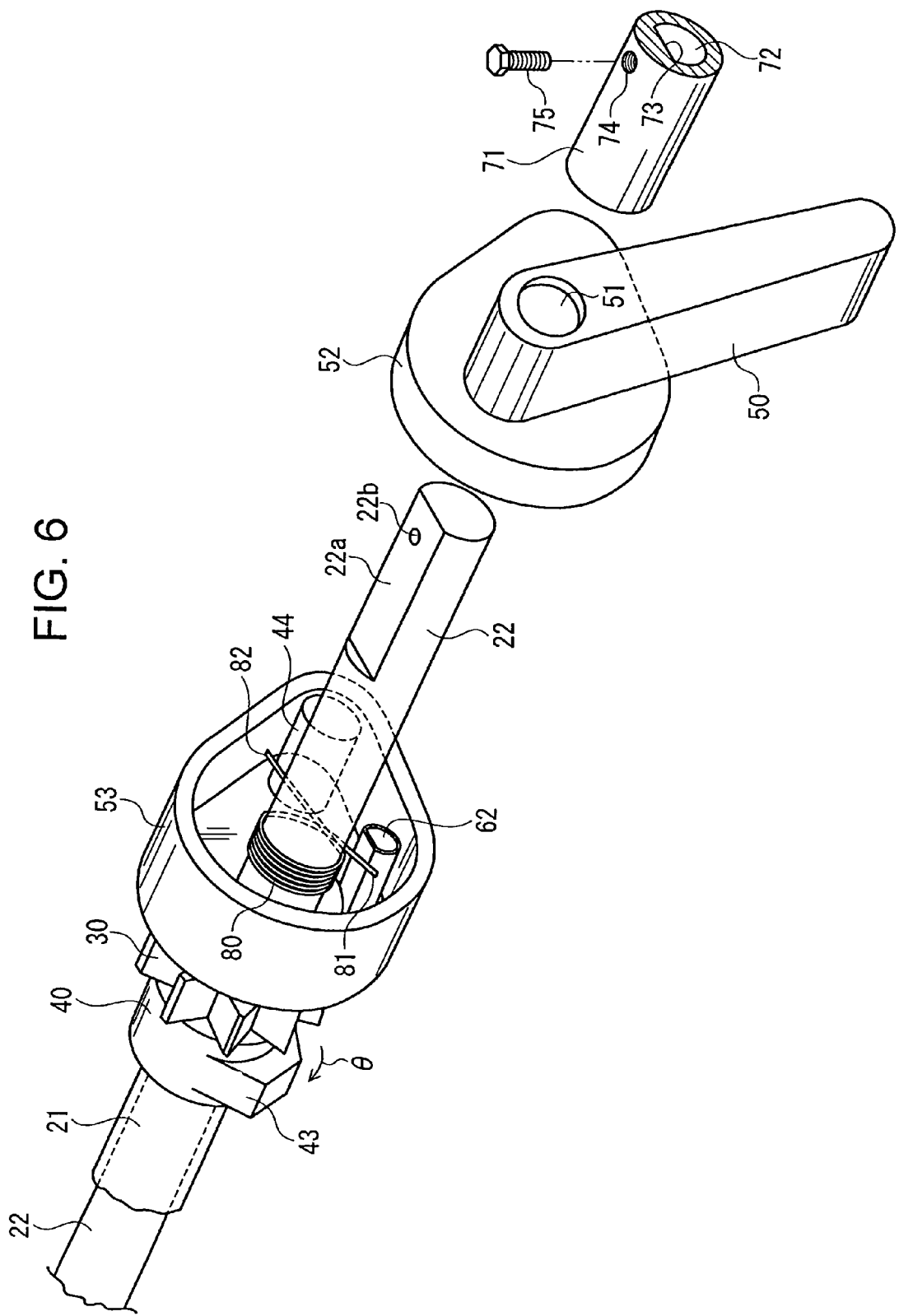
FIG. 6 is an exploded perspective view of a movable body.

Hereinafter, an embodiment will be explained with reference to drawings. FIG. 1(a) is a front perspective view of a seat main body of a child seat according to an embodiment, and FIG. 1(b) is a rear perspective view of thereof. FIG. 2 is a perspective view of a guide rail and a movable body. FIG. 3(a) is a horizontal cross-sectional view of a guide rail and FIGS. 3(b) and 3(c) are cross-sectional views taken along lines 3(b)-3(b) and 3(c)-3(c) in FIG. 3(a), respectively. FIGS. 4, 5 and 6 are exploded perspective views of the movable body.

The seat main body 1 has a seat portion 1a and a backrest portion 1b. The seat main body 1 forms the child seat mounted on a base member (not shown) to be reclined.

In the backrest portion 1b, vertically extending perforated holes 1c are provided on the right side and on the left side respectively, and in order to block the perforated holes, a sliding member 2 of a plate shape is provided on the front side of the backrest portion 1b. On the sliding member 2, there are provided webbing inserting holes 2a to insert the webbing for restraining children.

On the rear surface of the sliding member 2, projecting pieces 2b for supporting a shaft are protruded rearwards on the closest portion of the webbing inserting holes 2a. The projecting pieces 2b are protruded at the rear side of the backrest portion 1b along the perforated holes 1c. A circular hole is formed in the inside of the projecting piece 2b, and a lever interlocking column 21 and a handle interlocking shaft 22 described below are inserted into the circular hole. Therefore, when the column 21 and the shaft 22 move vertically, the sliding member 2 moves vertically as well.

Further, as shown in FIG. 1(b), the webbing inserting parts 2a and the handles 70 on both sides of the shaft 22 are positioned in substantially the same height.

On both sides on the rear surface of the backrest portion 1b, guide rails 10 extending vertically are mounted.

As shown in FIGS. 2, 3(a) and 3(b), the guide rail 10 has a main plate part 11 placed on the backrest portion 1b and side plates portions 12 and 13 standing along both sides of the main plate, and the cross-sectional view of the guide rail is a U-shaped.

On the main plate portion 11, a number of fragmented locking teeth 14 obliquely erected are provided at predetermined intervals vertically as the locking portion. Further, on the main plate portion 11, a rack 15 is vertically provided. On the side plate portions 12 and 13, slots (long hole) 12a and 13a vertically extended are provided.

A movable body 20 is mounted on the guide rail 10 so as to move vertically along the guide rail 10.

As shown in FIGS. 4 to 6, the movable body 20 includes the lever interlocking column 21, the handle interlocking shaft 22, a pinion 30 engaging the rack 15, an engaging body 40 engaging the locking teeth 14, a lever 50 for disengaging the engaging body 40 and the locking teeth 14, a torsion spring 80 (FIG. 6) for biasing the engaging body 40 in the direction of engaging the locking tooth 14, a spring receiving slider 60 for receiving one end portion of the torsion spring 80 for generating the bias strength and for sliding along the outer side surface of the side plate portions 12 and 13 of the guide rail 10, and a handle 70 for rotating the pinion 30.

The handle interlocking shaft 22 is smaller in diameter and longer than the lever interlocking column 21. It is inserted into the column 21 and its both ends are protruded from the both ends of the column. As specifically described later, the handle interlocking shaft 22 is inserted into each hole of the engaging body 40, the pinion 30, the spring receiving slider 60, the sub-lever 53 and the lever 50, and a boss portion of the handle 70. On both ends of the shaft 22, there are provided planar surface portions 22a (FIGS. 2 and 6) having a shape which is cut in a chordal direction, and a female screw 22b (FIG. 6) is provided on the plane surface portion 22a.

In a shaft hole 31 of the pinion 30, there is provided a chordal direction portion 32 having a planar shape which is engaged with the planar surface portion 22a. Therefore, the shaft 22 and the pinion 30 integrally rotate together.

The engaging body 40 has a teardrop shape from a side view and the shaft hole 41 in which the lever interlocking column 21 is inserted. On both ends of the column 21, slots 21a (FIGS. 2 and 5) are provided in a direction parallel to the shaft center line at two places facing each other along the diameter direction. In the inner periphery face of the shaft hole 41 of the engaging body 40, there are provided two pieces of concaves 42 engaging the slots 21a. The concaves 42 face each other along the diameter direction and extend in a direction parallel to the shaft center line of the shaft hole 41.

From the outer periphery surface of the engaging body 40, a latch 43 for engaging the engaging teeth 14 of the guide rail 10 is protruded. The engaging body 40 is provided to extend in a direction opposite to the latch 43 with the shaft hole 41 in between, and a link pin 44 is protruded from the end thereof. The link pin 44 is extended in a direction parallel to the shaft center line of the shaft hole 41. The link pin 44 is inserted into the pin inserting hole 55 of a sub-lever 53 described below.

The lever 50 has the shaft hole 51 into which the shaft 22 is inserted. The lever 50 is extended in a direction perpendicular to the shaft center line of the shaft hole 51.

On the lever 50, a frame portion 52 surrounding the shaft hole 51 is provided and the sub-lever 53 engages the frame portion 52. On the sub-lever 53, the shaft hole 54 into which the shaft 22 is inserted is provided. On the peripheral border of the shaft hole 54, a semicircular long hole 56 having a concentric shape with the shaft hole 54 is provided. On the sub-lever 53, a pin inserting hole 55 spaced from the shaft hole 54 is provided.

The spring receiving slider 60 is a plate-shaped member having the circular shaft hole 61 into which the shaft 22 is inserted, and a spring receiving pin 62 projecting parallel to the shaft center line of the shaft hole 61 is protruded on one side thereof. The pin 62 is inserted into the long hole 56 of the lever 50. Further, on the other side of the spring receiving slider 60, a concave portion 63 slidably engaging the slots 12a or 13a of the guide rail 10 is protruded. By engaging the concave portion 63 on the slots 12a or 13a, the spring receiving slider 60 does not rotate and moves vertically along the guide rail 10.

The handle 70 has a substantially disk shape and, as shown in FIG. 5, a boss portion 71 having a cylinder shape is protruded in the center of the plate face at one side thereof. The shaft 22 is inserted into an inner hole 72 of the boss portion 71. In the inner hole 72, the planar shaped chordal direction portion 73 which is engaged with the planar surface portion 22a of the shaft 22 is provided. Thus, the handle 70 and the shaft 22 integrally rotate together.

In the boss portion 71, there is provided an inserting hole 74 of a lock bolt 75.

As shown in FIGS. 5 and 6, the shaft holes 41, 31, 61, 54 and 51 of the engaging body 40, the pinion 30, the sub-lever 53, the spring receiving slider 60 and the lever 50 are provided coaxially, and the boss portion 71 of the handle 70 is provided coaxially, as well. The shaft 22 is inserted into those shaft holes 41, 31, 61, 54 and 51 and the inner hole 71 of boss portion, and the lock bolt 75 is inserted into the female screw 22b through the hole 74, whereby the handle 70 and the shaft 22 are fixed. As shown in FIG. 5, in the column 21 in which the shaft 22 is inserted, the end portion of the column is inserted into the shaft hole 41 of the engaging body 40, and the slots 21a are engaged with the concaves 42, so that the engaging body 40 and the column 21 are unified.

As shown in FIG. 6, the link pin 44 of the engaging body 40 is inserted into the pin inserting hole 55 of the sub-lever 53 and protruded in the inside of the sub-lever 53. Therefore, the engaging body 40, the sub-lever 53 and the lever 50 integrally rotate together.

The spring receiving pin 62 of the spring receiving slider 60 is protruded in the inside of the sub-lever 53 while passing through the circular long hole 56 of the sub-lever 53.

In the sub-lever 53, the torsion spring 80 is disposed on the shaft 22. One end 81 of the torsion spring 80 is placed on the spring receiving pin 62 and the other end 82 thereof is placed on the link pin 44. The spring 80 obtains a reaction force from the spring receiving pin 62, whereby the link pin 44 is arranged to be biased in the clockwise direction in FIG.

6. Therefore, when the engaging body 40 rotates in the counterclockwise direction to θ as shown in FIG. 6, the engaging body 40 is biased in the θ direction as shown in FIG. 6 by the spring 80.

As described above, the movable bodies 20 having its engaging bodies 40 and the like are mounted on both ends of the shaft 22, respectively. Accordingly, the left and right handles 70 integrally rotate through the shaft 22 at all times. Further, on both ends of the column 21, the left and right engaging bodies 40 are engaged in both ends of the column 21, whereby the left and right engaging bodies 40 and the lever 50 integrally rotate through the column 21 at all times.

The method for controlling the height of the webbing of the child seat described above will be described below.

Under the state of hands-off from the lever 50, the engaging body 40 is arranged to be biased in the counterclockwise direction to θ in FIG. 6 by the spring 80 and the latch 43 is engaged on the engaging teeth 14. Accordingly, the movable body 20 is prevented from moving downward.

In case of moving the movable body 20, first, the lever 50 is turned in the counterclockwise direction (in the counterclockwise direction to θ as shown in FIG. 6. Therefore, the engaging body 40 rotates through the link pin 44 in the counterclockwise direction to θ and the latch 43 is taken off from the engaging teeth 14, whereby the movable body 20 can vertically move. Further, since the left and right engaging bodies 40 are interlocked through the column 21, operating of the levers on any one of the left and right sides enables the latch 43 of the left and right engaging bodies 40 to be taken off from the engaging teeth 14 of each guide rail 10.

After turning the handle 70, rotating the pinion 30 and moving the movable body 20 vertically to the desired height, a hand is removed from the lever 50 to engage the latch 43 on the engaging teeth 14, so that the movable body 20 is locked. In addition, since each of the left and right pinions 30 is interlocked and rotates through the shaft 22, the left and right movable bodies 20 move smoothly along each of the guide rails 10. The lever 50 and the handle 70 are exposed from both left and right sides to be operable conveniently from the left and right sides.

Further, in this embodiment, since the height of the webbing inserting hole 2a is substantially the same as the height of the handle 70, the height of the webbing inserting hole 2a can be seen directly from the height of the handle 70, whereby the height control of the webbing can be easily performed.

Further, in case that the movable body 20 is raised, the handle 70 may be turned in the counterclockwise direction without operating the lever 50 as shown in FIG. 6. The latch 43 is pushed toward the inclined lower surface of the engaging teeth 14 and rotates in the counterclockwise direction to θ, whereby it moves along the surface of the engaging teeth 14 and is engaged in the engaging teeth 14 on the upper side.

The embodiment is one example of the present invention and the invention may take a form other than the drawings.

The disclosure of Japanese Patent Application No. 2005-237882 filed on Aug. 18, 2005 is incorporated herein as a reference.

What is claimed is:

1. A child seat comprising:
   a main body having a seat portion and a backrest portion with a hole therein;
   a sliding member disposed at the backrest portion to cover the hole and having webbing inserting holes;
   at least one guide rail mounted vertically on a rear side of the main body, said guide rail having a plurality of locking parts vertically spaced at intervals and a vertically extending rack; and
   a movable body attached to the sliding member to move along the at least one guide rail, said movable body being disposed to be operable from a side of the backrest portion and having a pinion engaging the rack and an engaging body for locking the movable body by engaging the locking part so that the movable body can vertically and continuously slide along the guide rail and be fixed as desired.

2. A child seat comprising:
   a main body having a seat portion and a backrest portion with a hole therein;
   a sliding member disposed at the backrest portion to cover the hole and having webbing inserting holes;
   at least one guide rail mounted vertically on a rear side of the main body; and
   a movable body attached to the sliding member to move along the at least one guide rail, said movable body being disposed to be operable from a side of the backrest portion,
   wherein said at least one guide rail includes a plurality of locking parts vertically spaced at intervals and a vertically extending rack; and the movable body includes a pinion engaging the rack, a handle connected to the pinion, an engaging body for locking the movable body by engaging the locking part, and an operating piece for engaging and disengaging the engaging body and the locking part.

3. A child seat according to claim 2, wherein the handle and the operating piece protrude from the side of the backrest portion so as to be operable from the side.

4. A child seat according to claim 3, further comprising a shaft connected to the handle, and a column disposed over the shaft and connected to the operating piece.

5. A child seat according to claim 4, wherein one handle and one operating piece are attached to each of two sides of the shaft and column.

6. A child seat according to claim 3, wherein the webbing inserting hole and the handle are disposed at substantially same height.

7. A child seat according to claim 1, wherein the guide rail and the movable body are provided on right and left of the backrest portion respectively; and an interlocking member for interlocking the left movable body and the right movable body is provided.

* * * * *